(12) United States Patent
Day

(10) Patent No.: US 7,376,198 B2
(45) Date of Patent: May 20, 2008

(54) METHODS AND APPARATUS FOR MULTICASTING CONTENT

(75) Inventor: Mark Stuart Day, Milton, MA (US)

(73) Assignee: Cisco Technology, Inc., San Jose, CA (US)

( * ) Notice: Subject to any disclaimer, the term of this patent is extended or adjusted under 35 U.S.C. 154(b) by 943 days.

(21) Appl. No.: 10/659,484

(22) Filed: Sep. 10, 2003

(65) Prior Publication Data

US 2005/0053119 A1 Mar. 10, 2005

(51) Int. Cl.
*H04L 27/04* (2006.01)
*H04N 7/10* (2006.01)

(52) U.S. Cl. .................................. 375/295; 725/32
(58) Field of Classification Search ............... 375/138, 375/132, 295, 363; 370/401; 714/776, 751; 709/229, 232; 348/21; 725/25, 31, 32, 75, 725/76

See application file for complete search history.

(56) References Cited

U.S. PATENT DOCUMENTS

| | | | |
|---|---|---|---|
| 6,005,605 A * | 12/1999 | Kostreski et al. ............. | 348/21 |
| 6,061,820 A * | 5/2000 | Nakakita et al. ............ | 714/751 |
| 6,233,618 B1 * | 5/2001 | Shannon .................... | 709/229 |
| 6,282,181 B1 | 8/2001 | Stark et al. ................. | 370/335 |
| 6,532,253 B1 | 3/2003 | Chen ......................... | 375/146 |
| 6,567,462 B1 | 5/2003 | Brunner et al. ............. | 375/148 |
| 6,891,841 B2 * | 5/2005 | Leatherbury et al. ....... | 370/401 |
| 7,222,185 B1 * | 5/2007 | Day ........................... | 709/232 |
| 2003/0200499 A1 * | 10/2003 | Khayrallah ................. | 714/776 |

FOREIGN PATENT DOCUMENTS

WO    WO 01/91397 A2    11/2001
WO    WO 01/99387 A2    12/2001

OTHER PUBLICATIONS

Randy Roberts, "The ABCs of Spread Spectrum—A Tutorial", <http://www.sss-mag.com/ss.html> Visited on Jun. 30, 2003, pp. 1-8.

* cited by examiner

*Primary Examiner*—Don N Vo
(74) *Attorney, Agent, or Firm*—Barry W. Chapin, Esq.; Chapin IP Law, LLC

(57) ABSTRACT

A transmitter device of the content distribution system transmits content portions of a content message to a receiver device using respective multicast channels within a network. In such an arrangement, by using multiple multicast channels for transmission of the content portions forming the content message, the transmitter device limits the ability for an unauthorized user, monitoring a particular multicast channel, to distinguishing the content portions from noise or to retrieve the complete content message from the transmitter device, thereby providing security to the content message. Furthermore, the content distribution system utilizes multicast channels within a network to deliver the content portions to all receiver devices in communication with the network, thereby minimizing the power requirements needed by the transmitter device to deliver the content portions to a receiver device farthest from the transmitter device.

32 Claims, 7 Drawing Sheets

METHODS AND APPARATUS FOR MULTICASTING CONTENT

BACKGROUND

In general, content distributor devices (e.g., radio transmitters, cellular wireless transmitters) transmit audio, images, or text, (e.g., content or content messages) to end user or receiver devices (e.g., radio receivers, cellular wireless receivers) using a variety of distribution mechanisms.

One conventional mechanism for content distribution involves broadcast transmission of content. In broadcast transmission, such as radio or satellite broadcast, a single content source transmits content to many receivers (one-to-many transmission). Certain broadcast transmissions, such as shared-medium broadcasts or Code-Division Multiple Access (CDMA) transmissions, for example, utilize spread-spectrum techniques in broadcasting the content. Spread-spectrum is a modulation technique that uses a pseudo-noise (PN) code sequence to "spread" a signal over multiple frequencies within a channel for transmission (e.g., broadcast) to a receiver device. For example, a transmission device combines an input signal with a user-specific pseudo-noise code and transmits the combined signal to a receiver device. The receiver device locally produces a correlated signal by generating the same PN code sequence and synchronizing its code sequence with that of the received code sequence. The receiver device, therefore, tracks the received encoded signal to recover the input signal.

The spread-spectrum technique provides security to a signal transmitted to a receiver device. For example, the spread-spectrum technique provides antijam capabilities to the transmitted signal. In spread-spectrum, the transmitter transmits the signal, to a receiver device, using several frequencies. In such a transmission, an unauthorized user can have difficulty in distinguishing the signal from noise. The spread-spectrum technique, therefore, limits the ability for an unauthorized user to "jam" or inject noise within the transmission.

The spread-spectrum technique, furthermore, provides low probability of interception (LPI) capabilities to the transmitted signal. For example, when using the spread-spectrum technique, the transmitter device transmits a signal to a receiver device using several frequencies. In such a transmission, an unauthorized user can have difficulty in retrieving the complete signal from the transmitter device. The spread spectrum technique, therefore, minimizes interception of the transmitted signal.

Another conventional mechanism for content distribution involves multicast transmission. In multicast transmission, such as Internet Protocol (IP) multicast or application-level multicast, a content source transmits content to many receivers (e.g., one-to-many) using a multicast-enabled network. For example, assume a content source (e.g., content server) receives, over a computer network, requests for content from multiple requesting devices (e.g., client devices). The content source provides content to the network in response to the content requests. In multicast transmission, multicast-enabled data communications devices within the network distribute the content to all of the multiple requesting devices. The content source, therefore, provides the requested content to the network once and allows the multicast-enabled data communications devices within the network to distribute the content to the requesting devices. Multicast distribution of content over the network limits loading of a particular content source with the task of providing, for multiple iterations, identical content to multiple requesting devices, thereby allows for a more efficient operation of the content source.

SUMMARY

Conventional techniques for providing content to a user suffer from a variety of deficiencies.

For example, as described above, certain broadcast transmissions utilize spread-spectrum techniques in transmitting a signal (e.g., content) to a receiver to provide security to such signal transmissions. Broadcast transmission of content, however, has a cost component associated with transmitting the content to a particular audience. For example, to broadcast content as a radio frequency (RF) signal, the transmitter of the signal must drive the signal with a sufficient amount of power to deliver the signal to the farthest receiver from the transmitter. The greater the distance between the receiver and the transmitter, the greater the amount of power required for transmission of the signal to the receiver. Such an increase in the power requirement for broadcasting the signal to a receiver, in turn, increases the cost of the broadcast for the transmitter of the signal.

Also as indicated above, other conventional mechanisms for content distribution involves multicast transmission of content. Certain multicast-enabled networks provide multicast transmission of content to multiple receivers. In such conventional networks, a content source provides, at a single instance, content requested by multiple requesting devices to the network. The multicast-enabled data communications devices within the network then distribute the content to the multiple requesting devices. Compared to the transmitters in broadcast transmission, the content source does not experience an increase in cost for transmitting the content requesting devices located at a relatively large distance away from the content source. However, content sources, in certain conventional cases, transmit content over multicast-enabled networks in an unprotected or non-secured manner, thereby allowing unauthorized users to intercept and identify the content. For content considered as privileged or private communication (e.g., business communications), such interception and identification of the content can be damaging (e.g., financially damaging) to the transmitter or receiver.

In certain cases, conventional transmitters encrypt content prior to transmitting the content to a receiver over a network. Transmitter devices, however, typically transmit encrypted content over a single channel or path within the network. For example, a multicast channel within the conventional multicast network includes a number of muliticast-enabled data communications devices. These data communications devices carry the encrypted information between the content server and the requesting device. In such a case, an unauthorized user can monitor a muliticast-enabled data communications device within the network and intercept, and potentially decrypt, the encrypted content. For encrypted content considered as privileged or private communication (e.g., business communications), such interception and decryption of the encrypted content can be damaging (e.g., financially damaging) to the transmitter or receiver.

By contrast, embodiments of the present invention significantly overcome such deficiencies and provide techniques for transmitting and receiving content in a content distribution system. A transmitter device of the content distribution system transmits content portions of a content message to a receiver device using multiple multicast channels within a network. The receiver device, in turn, receives the content portions transmitted over each respective multicast channel in the network and assembles the content portions to form the original content message. In such an arrangement, by using multiple multicast channels for transmission of the content portions forming the content message, the transmitter device limits the ability for an unauthorized user, monitoring a particular multicast channel, to distinguish the content portions from noise or to retrieve the complete content message from the transmitter device, thereby providing security to the content message. Furthermore, the content distribution system utilizes multicast channels within a network to deliver the content portions to all receiver devices in communication with the network, thereby minimizing the power requirements needed by the transmitter device to deliver the content portions to a receiver device farthest from the transmitter device.

In one embodiment of the invention, a transmitter device of a content distribution system detects a plurality of multicast channels for transmission of the content to a receiver device. The transmitter device assigns portions of the content to respective multicast channels of the plurality of multicast channels for distribution to the receiver device and transmits the portions of the content to the receiver device using the respective assigned multicast channels. The use of multiple multicast channels by the transmitter device allows cost-effective delivery of the content to a receiver device at a relatively large distance from the transmitter device. Furthermore the use of multiple multicast channels provides security to content transmitted over the content distribution system by minimizing the ability for an unauthorized user, monitoring a particular multicast channel, to intercept an entire content message or discern a difference between the content portions and noise transmitted over the multicast channels.

In one arrangement, the transmitter device assigns a noise element to at least one of the multicast channels and transmits the noise element using the assigned multicast channel. The noise element provides additional security to the content portions transmitted via the assigned multicast channels by minimizing the possibility for an unauthorized user, monitoring the multicast channels, to detect a difference between the noise element and the content portions.

In one arrangement, the transmitter device, prior to transmitting the noise element using the assigned multicast channel, transmits a first synchronization marker to the receiver device using the assigned multicast channel. After completing transmission of the noise element using the assigned multicast channel, the transmitter device transmits a second synchronization marker to the receiver device using the assigned multicast channel. After the transmitter device transmits the second synchronization marker to the receiver device using the assigned multicast channel, the transmitter device transmits a portion of the content to the receiver device using the respective assigned multicast channel. Use of the synchronization markers allows the receiver device to identify and discard the noise elements transmitted by the transmitter device.

In one arrangement, the transmitter device detects a time duration associated with a first multicast channel of the plurality of multicast channels. The transmitter device, when assigning and transmitting, transmits a first portion of the content to the receiver device during the time duration using a first multicast channel. The transmitter device further detects expiration of the time duration associated with the first multicast channel, switches to a second multicast channel in response to detecting expiration of the time duration, and transmits a second portion of the content to the receiver device using the respective second multicast channel. The transmitter device and the receiver device each utilize time duration information (e.g., time duration) to substantially synchronously transmit or receive content portions, over each of the multicast channels in a "rolling fashion" (e.g., serial use of each of the multicast channels, one after another). The transmitter device and the receiver device utilize each multicast channel for a relatively small period of time (e.g., relatively small time duration) and, therefore, minimize the possibility for an unauthorized user or attacker to inject unauthorized content (e.g., noise) into the message or content transmitted to the receiver device.

In one arrangement, the transmitter device prior to transmitting the portions of the content to the receiver device using the respective assigned multicast channels, transmits a first authorization value to the receiver device using the respective assigned multicast channels to indicate a start of transmission from and an identity of the transmitter device. After completing transmission of the portions of the content to the receiver device using the respective assigned multicast channels, the transmitter device transmits a second authorization value to the receiver device using the respective assigned multicast channels to indicate an end to the transmission from and the identity of the transmitter device. The authorization values indicate, to the receiver device, an identity of the transmitter device and a beginning and an ending, respectively, to legitimate communications (e.g., content portions) carried by the multicast channel. Use of the authorization values limits the ability for an unauthorized user to inject, undetected, unauthorized content or noise into a particular multicast channel and thereby "jam" the transmission of the content message from the transmitter device to the receiver device.

In one arrangement, the transmitter device, when assigning, based upon a content spreading characteristic, assigns portions of the content to the respective multicast channels of the plurality of multicast channels for distribution to the receiver device, the content spreading characteristic indicating a division of the content into the respective portions of the content. Furthermore, when transmitting, the transmitter device substantially simultaneously transmits the portions of the content to the receiver device using the respective assigned multicast channels.

In one arrangement, the transmitter device, when detecting, detects a plurality of multicast channels with each of the plurality of multicast channels formed along a distinct communication path within the content distribution system. In such a case, during transmission of content portions, not all of the content portions travel through a single data communications device. Such an arrangement minimizes the ability for an unauthorized user monitoring a single data communications device within the network from intercepting all of the content portions forming a content message, thereby providing security to transmission of the content message via the content distribution system.

In one arrangement, the transmitter device is configured as a computerized device associated with a content distribution system having at least one communications interface, a controller (e.g., a memory and processor), and an interconnection mechanism coupling the at least one communications interface and the controller. The controller is configured to detect a plurality of multicast channels for transmission of the content to a receiver device, assign portions of the content to respective multicast channels of the plurality of multicast channels for distribution to the receiver device, and transmit the portions of the content to the receiver device using the respective assigned multicast channels.

Other embodiments of the invention include a computer system, such as a data communications device, computerized device, or other device configured with software and/or circuitry to process and perform all of the method operations noted above and disclosed herein as embodiments of the invention. In such embodiments, the device, such as a data communications device, comprises one or more communications interfaces (e.g., network interfaces), a memory (e.g., any type of computer readable medium, storage or memory system), a processor and an interconnection mechanism connecting the communications interface, the processor and the memory. In such embodiments, the device encodes the memory system with a content portion transmission application that, when performed on the controller, produces a content portion transmission process that causes the computer system to perform any and/or all of the method embodiments, steps and operations explained herein as embodiments of the invention. Also, a switch, router or other device programmed or otherwise configured to operate as explained herein is an embodiment of the invention.

Other arrangements of embodiments of the invention disclosed herein include software programs to perform the method embodiment steps and operations as summarized above and disclosed in detail below. As an example, a content portion transmission software control application, such as a data communications device operating system configured to operate as explained herein is an embodiment of the invention. More particularly, a computer program product is disclosed which has a computer-readable medium including computer program logic encoded thereon that, when executed on at least one processor or controller, causes the processor or controller to perform the operations (e.g., the methods) indicated herein as embodiments of the invention. Such arrangements of the invention are typically embodied as software, logic instructions, code and/or other data (e.g., data structures) arranged or encoded on a computer readable medium such as an optical medium (e.g., CD-ROM), floppy or hard disk or other medium such as firmware or micro-code in one or more ROM or RAM or PROM chips or as an Application Specific Integrated Circuit (ASIC). These software or firmware or other such configurations include those installed onto a computer system, data communications device or other device to cause such a device to perform the techniques explained herein as embodiments of the invention.

Embodiments of the invention also include computer program products such as disks, or other readable media that have a computer-readable medium including computer program logic encoded thereon for distributing content in a networked computer environment, such that the computer program logic, when executed on at least one processing unit with the presence server, causes the at least one processing unit to perform any or all of the aforementioned methods.

In one example embodiment, computer software and/or hardware mechanisms implement the methods embodiments of the invention within a data communications device apparatus. It is to be understood that the system of the invention include those embodied strictly as a software program, as software and hardware, or as hardware alone. The features of the invention, as explained herein, may be employed in data communications devices and other computerized devices and software systems for such devices such as those manufactured by Cisco Systems, Inc. of San Jose, Calif.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Embodiments of the present invention provide techniques for transmitting and receiving content in a content distribution system. A transmitter device of the content distribution system transmits content portions of a content message to a receiver device using multiple multicast channels within a network. The receiver device, in turn, receives the content portions transmitted over each, respective multicast channel in the network and assembles the content portions to form the original content message. In such an arrangement, by using multiple multicast channels for transmission of the content portions forming the content message, the transmitter device limits the ability for an unauthorized user, monitoring a particular multicast channel, to distinguishing the content portions from noise or to retrieve the complete content message from the transmitter device, thereby providing security to the content message. Furthermore, the content distribution system utilizes multicast channels within a network to deliver the content portions to all receiver devices in communication with the network, thereby minimizing the power requirements needed by the transmitter device to deliver the content portions to a receiver device farthest from the transmitter device.

Figure 1:
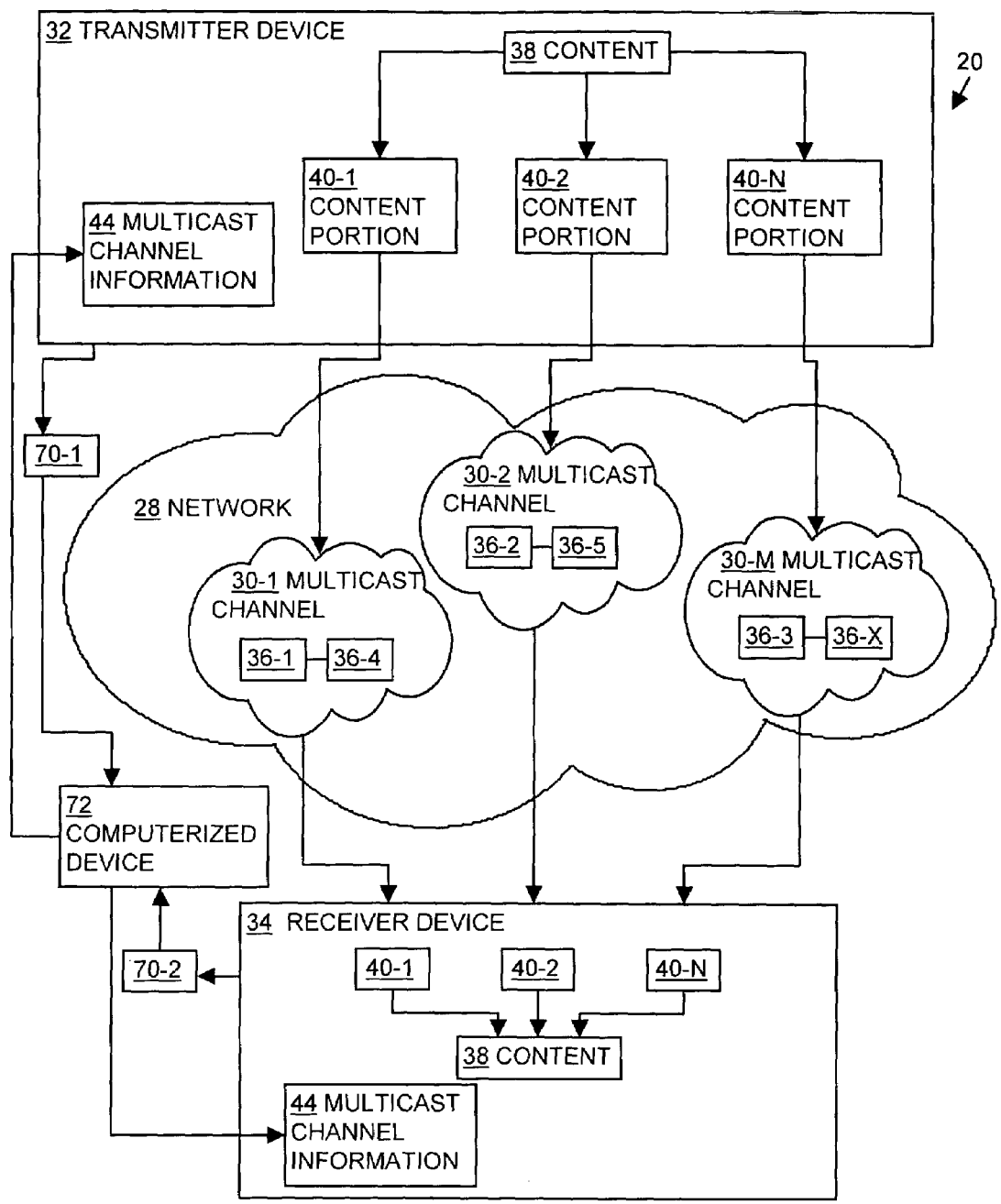
FIG. 1 shows a system for distributing content, according to one embodiment of the invention.

FIG. 1 shows a content distribution system 20, according to one embodiment of the invention. The content distribution system 20 includes a transmitter device 32, a network 28, and a receiver device 34.

The transmitter device 32 is a computerized device configured to transmit content 38 (e.g., a content message) to the receiver device 34. For example, the transmitter device 32 is configured as a computer, such as a personal computer, or as a cellular telephone. In one arrangement, the transmitter device 32 generates the content 38 for transmission to the receiver device 34. In another arrangement, the transmitter device 32 receives the content 38 from a content source external to the transmitter device 32 and transmits the content 38 to the receiver device 34.

The receiver device 34, in one arrangement, is a computerized device configured to receive content 38 from the transmitter device 32. For example, the receiver device 34 is configured as a computer, such as a personal computer, or as a cellular telephone.

The network 28 allows communication between the transmitter device 32 and the receiver device 34. In one arrangement, the network 28 is an ad hoc wireless network. In another arrangement, the network 28 is a computer network, such as the Internet or a local area network (LAN), that includes data communication devices 36 (e.g., routers, switches, etc.) that transmit content portions 40, forming the content message 38, to the receiver device 34. Particular multicast-enabled data communication devices 36 (e.g., devices that provide a one-to-many transmission of content portions 40) group to form multicast channels 30. For example, as illustrated in FIG. 1, the network includes multicast channels 30-1, 30-2, 30-M. Each multicast channel 30-1, 30-2, 30-M provides one-to-many (e.g., multicast) transmission of content 38 from a single sender (e.g., transmitter device 32) to multiple receiver devices 34. For convenience, FIG. 1 illustrates the multicast channels 30-1, 30-2, 30-M, in communication with a single receiver device 34.

The content 38 carried by the network 28, as transmitted by the transmitter device 32 and as received by the receiver device 34, is configured as text, audio, or video data, for example.

Figure 2:
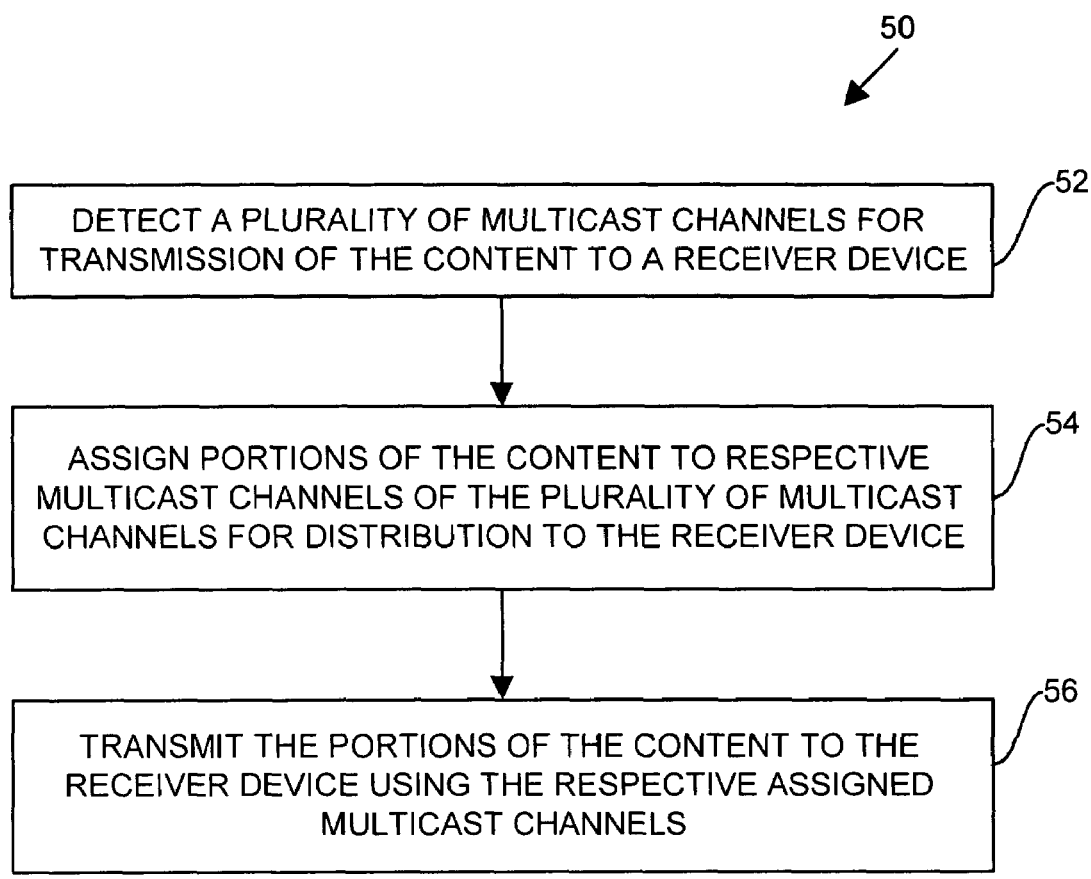
FIG. 2 illustrates a flow chart of a procedure performed by the system of FIG. 1, according to one embodiment of the invention.

FIG. 2 illustrates a flowchart 50 showing a method for transmitting content 38 by the transmitter device 32 of the content distribution system 20, according to one embodiment of the invention. The transmitter device 32 and the receiver device 34 utilize multiple multicast channels 30 within the network 28 to, respectively, transmit and receive content portions or fragments 40, forming a content message 38, through the network 28. Transmission and reception of the content portions 40 in such a manner limits the ability for an unauthorized user, monitoring a particular multicast channel 30, to distinguishing the content portions 40 from a noise signal and thereby provides security to non-encrypted content 38 carried by the network 28.

In step 52, the transmitter device 32 detects a plurality of multicast channels 30-1, 30-2, 30-M for transmission of the content 38 to a receiver device 34. For example, in one arrangement, the transmitter device 32 receives multicast channel information 44 from external source, such as a computerized device 70 storing the multicast channel information 44. In one arrangement, the multicast channel information 44 includes addresses corresponding to data communications devices 36 associated with each multicast channel 30-1, 30-2, 30-M.

In step 54, the transmitter device 32 assigns portions 40-1, 40-2, 40-N of the content 38 to respective multicast channels 30-1, 30-2, 30-M of the plurality of multicast channels 30 for distribution to the receiver device 34. For example, in one arrangement, as will be described below, the transmitter device 32 divides the content 38 into content portions 40 based upon a content spreading characteristic or spreading code and assigns each content portion 40 to a particular multicast channels 30-1, 30-2, 30-M. In another arrangement, as will be described below, the transmitter device 32 assigns content portions 40 to the multicast channels 30 based upon a time duration associated with each multicast channel.

In step 56, the transmitter device 32 transmits the portions 40-1, 40-2, 40-N of the content 38 to the receiver device 34 using the respective assigned multicast channels 30-1, 30-2, 30-M. The receiver device 34 receives each content portion 40-1, 40-2, 40-N via each respective multicast channel 30-1, 30-2, 30-M and combines the portions 40-1, 40-2, 40-N to form the content message 38.

The use of multiple multicast channels 30, by the content distribution system 20, for transmission of the content 38, allows cost-effective delivery of the content 38 to a receiver device at a relatively large distance from the transmitter device. Furthermore the use of multiple multicast channels 30 provides security to content 38 transmitted over the network 28. For example, by using multiple multicast channels 30 to transmit a content message 38 to a receiver device 34, the transmitter device minimizes the ability for an unauthorized user, monitoring a particular multicast channel 30, to intercept the entire content message 38. For example, assume an unauthorized user monitors a first multicast channel 30-1 and intercepts the content portion 40-1 transmitted on the first multicast channel 30-1. Furthermore, assume the unauthorized user has a low probability of monitoring all of the multicast channels 30, within the content distribution system 20, used for transmission of all of the content portions 40 that form the content 38. The content portion 40-1 forms only a part of the content message 38 as a whole. The unauthorized user can only intercept a part of the content message 38 and, therefore, has a low probability of understanding the entire content message 38 as a whole.

Returning to FIG. 1, the transmitter device 32 and the receiver device 34 work in conjunction with each other to provide transmission and reception, respectively, of content 38 over the multicast channels 30 of the network 28. For example, assume that the transmitter device 32 and the receiver device 34 are configured to transmit and receive, respectively, confidential content 38 (e.g., content privy to the transmitter device 32 and the receiver device 34). The transmitter device 32 and the receiver device 34, respectively, transmit and receive such content 38 using multiple multicast channels 30 of the content distribution system 20 to provide secure transmission of the content 38 over the network 28.

For example, in one arrangement, the transmitter device 32 and the receiver device 34 establish a mutual communication link over the network 28, such as by using a handshaking procedure. During establishment of the communication link, either the transmitter device 32, the receiver device 34 or both the transmitter device 32 and the receiver device 34 detect a need to transmit and receive, respectively, the content 38 using the multicast channels 30 of the network 28 (e.g., the transmitter device 32 and the receiver device 34 detect the content 38 as having confidential information). In such an arrangement, after the transmitter device 32 and the receiver device 34 establish the communication link, the transmitter device 32 and the receiver device 34 each transmit a respective request 70-1, 70-2 to a computerized device 72 to request multicast channel information 44 that identifies multicast channels 30 within the network 28 to be used for distribution of content 38 (e.g., confidential content) within the content distribution system 22. The multicast channel information 44 ensures that the transmitter device 32 transmits, and that the receiver device 34 receives, content on corresponding (e.g., matching) multicast channels 30.

For example, assume the multicast channel information 44 includes information setting multicast channels 30-1, 30-2, and 30-3 of the network 28 for delivery of the content 38. The transmitter device 32 examines the multicast channel information 44 (e.g., the multicast addresses within the multicast channel information 44) as detects the multicast channels 30-1, 30-2, and 30-M as transmitting channels for the content 38 (e.g., transmission of the content to the receiver device 34). Similarly, the receiver device 34 also examines the multicast channel information 44 (e.g., the multicast addresses within the multicast channel information 44) and detects the multicast channels 30-1, 30-2, and 30-M as reception channels for the content 38 (e.g., reception of the content from the transmitter device 32). Based on such detection by the transmitter device 32 and the receiver device 34, the multicast channel information 44 configures the transmitter device 32 to transmit the content 38 over the multicast channels 30-1, 30-2, and 30-M and configures the receiver device 34 to receive the content 38 over the respective multicast channels 30-1, 30-2, and 30-M.

In one arrangement, the multicast channel information 44 includes addresses, such as Internet Protocol (IP) addresses, corresponding to each multicast group or channel 30-1, 30-2, and 30-M. In another arrangement, the multicast channel information 44 includes addresses, such as Internet Protocol (IP) addresses, of a data communications device 36 corresponding to an associated multicast channel 30-1, 30-2, and 30-M. For example, the multicast channel information 44 indicates, to the transmitter device 32, the IP address of data communications device 36-1 for the first multicast channel 30-1, the IP address of data communications device 36-2 for the second multicast channel 30-2 and the data communications device 36-3 for the third multicast channel 30-M (e.g., secure data communications devices "near" the transmitter device 32). The multicast channel information 44 also indicates, to the receiver device 34, the IP address of data communications device 36-4 for the first multicast channel 30-1, the IP address of data communications device 36-5 for the second multicast channel 30-2 and the data communications device 36-X for the third multicast channel 30-M (e.g., secure data communications devices "near" the receiver device 34). In such an arrangement, the content distribution system forms each of the multicast channels 30 along distinct communication paths (e.g., creates path diversity) within the network 28 of the content distribution system 20. In such an arrangement, during operation, the transmitter device 32 transmits, and the receiver device 34 receives, the content portions 40 forming the content message 38 via distinct data communications devices 36 within the network 28. Because not all of the content portions 40 travel through a single data communications device, such an arrangement minimizes the ability for an unauthorized user monitoring a single data communications device 36 within the network 28 from intercepting all of the content portions 40 forming the content message 38.

As indicated above, after detecting the multicast channels 30-1, 30-2, and 30-M for transmission of the content 28 to the receiver device 34, the transmitter device 32 assigns content portions or content portions 40 of the content message 38 to the respective multicast channels 30-1, 30-2, and 30-M. During the assignment, the transmitter device 32 splits or breaks the content 38 into content portions 40-1, 40-2, 40-N. For example, assume the content 38 is a text message. The transmitter device 32 divides the text message into content portions 40, or text components, such that each component includes an arbitrary number of bits or bytes forming the text message. After the transmitter device 32 splits the content into content portions 40-1, 40-2, 40-N, the transmitter device assigns the content portions 40-1, 40-2, 40-N to particular (e.g., corresponding) multicast channels 30-1, 30-2, 30-M. The transmitter device 32, in one arrangement, utilizes particular mechanisms to break the content 38 into particular content portions 40 and assign the content portions 40 to the respective multicast channels 30, as described in detail below.

After detecting the multicast channels 30-1, 30-2, and 30-M for reception of the content 38 from the transmitter device 32, the receiver device 34 also assigns multicast channels 30 for reception of content portions 40-1, 40-2, 40-N of the content 38 from the transmitter device 32. For example, in one arrangement, when assigning the multicast channels 30 the receiver device 34 monitors the multicast channels 30-1, 30-2, and 30-M within the network 28, based upon the multicast channel information 44.

When the transmitter device 32 transmits the portions 40-1, 40-2, 40-N of the content 38 to the receiver device 34 using the respective assigned multicast channels 30-1, 30-2, 30-M, the receiver device 34, in turn receives the portions 40-1, 40-2, 40-N of the content 38 using the respective assigned multicast channels 30-1, 30-2, 30-M. For example, as the transmitter device 32 transmits the first content portion 40-1 using the first multicast channel 30-1, the receiver device 34, monitoring the first multicast channel 30-1, receives the first content portion 40-1 over the first multicast channel 30-1. Thereafter, as the transmitter device 32 transmits the second content portion 40-2 and the third content portion 40-N using the second multicast channel 30-2 and the third multicast channel 30-M, respectively, the receiver device 34, monitoring the second multicast channel 30-2 and the third multicast channel 30-M, receives the second content portion 40-2 and the third content portion 40-N. In such an arrangement, transmission and reception of portions 40 of the content 38 using multiple multicast channels 30 within a network 28 provides security in to the content message 38, as a whole, transmitted over the network 28.

The use of multiple multicast channels 30 within a network 28 provides security to the content messages 38 transmitted from a transmitter device 32 to a receiver device 34. The use of multiple multicast channels 30 for transmission of content 38 limits the ability for an unauthorized user, monitoring a particular multicast channel 30, to either distinguish content portions 40 of a content message 38 from noise on the multicast channel 30 or retrieve the complete content message 38 from the transmitter device 32. In one arrangement, the content distribution system 20 provides additional security safeguards to the content 38 transmitted over the network 28 via the multicast channels 30.

Figure 3:
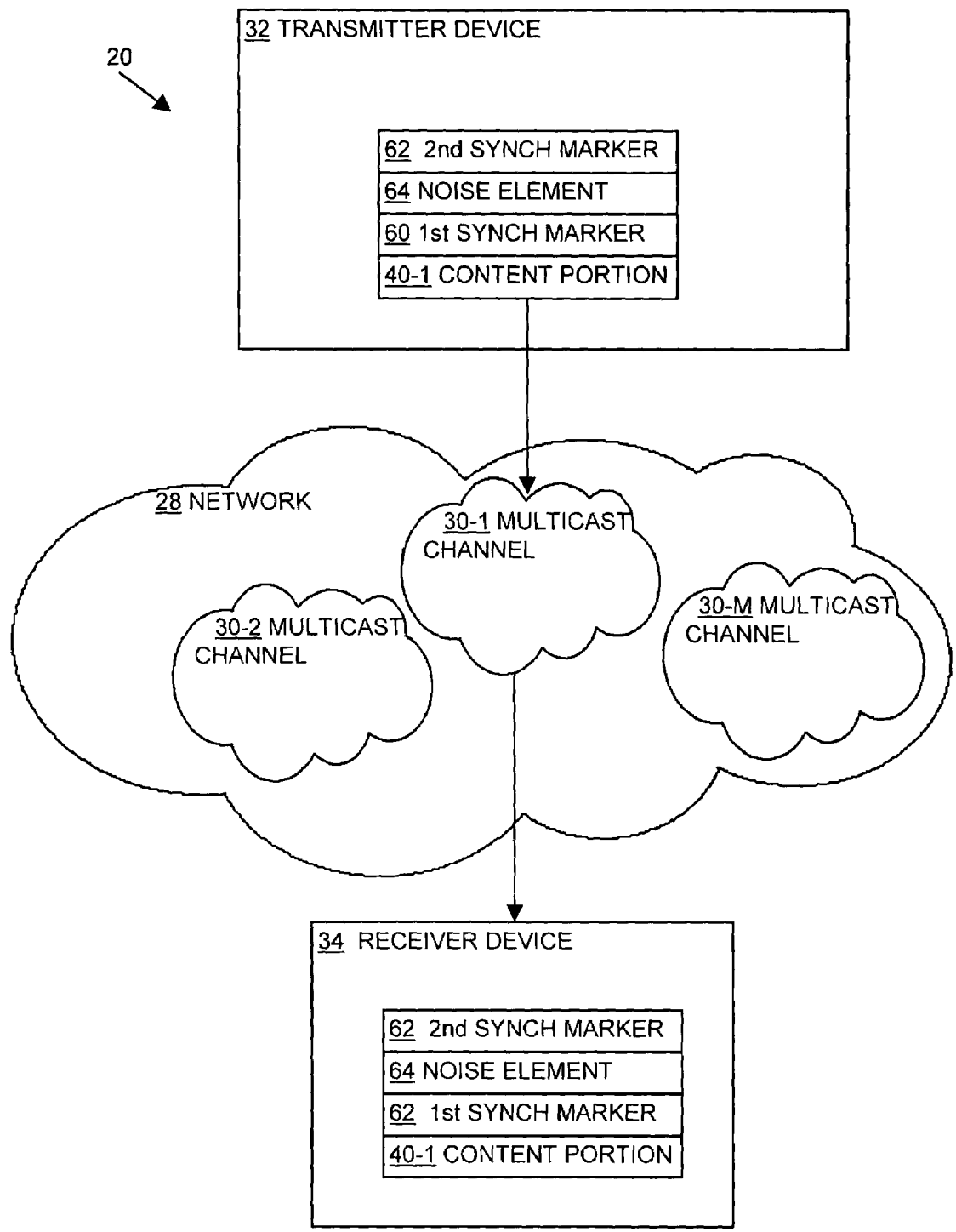
FIG. 3 illustrates the system of FIG. 1, according to one embodiment of the invention.

FIG. 3 illustrates an arrangement of the content distribution system 20 where the transmitter device 32 assigns a noise element 64 to a multicast channel 30-2 and transmits the noise element 64 over an assigned multicast channel 30-2. In one arrangement the noise element 64 is minimally different (e.g., not detectably different) from the content portions 40-1, 40-2 transmitted over the assigned multicast channel 30-2. The noise element 64, therefore, provides additional security to the content portions 40 transmitted via the assigned multicast channel 30-2 by minimizing the possibility for an unauthorized user, monitoring the multicast channel 30-2, to detect a difference between the noise element 64 and the content portions 40-1, 40-2.

For example, assume that the content 38 to be transmitted using the multicast channel 30-2 is the text message "cars, trucks, and buses" and that the transmitter device 32 splits the content 38 into content portions 40-1, 40-2, 40-N such that the first content portion 40-1 contains the text string "cars,", the second content portion 40-2 contains the text string "trucks,", and the third content portion 40-N contains the text string "and buses". Next, assume the transmitter device 32 transmits the content portions 40-1, 40-2, 40-N over the multicast channels 30-1, 30-2, 30-M along with noise elements 64 where the noise elements 64 are similar to the content portions 40 (e.g., configured as the same data type as the content portions 40). For example, using the first multicast channel 30-1, the transmitter device 32 transmits the first content portion 40-1 "cars," and then transmits a first noise element 64 "airplanes, "and a second noise element 64 "and tanks,". Using the second multicast channel 30-2, the transmitter device transmits a first noise element 64 "jeeps,", the second content portion 40-2 "trucks,", and a second noise element 64" and skis". Using the third multicast channel 30-M, the transmitter device transmits a first noise element 64 "pigeons,", a second noise element 64 "pedestrians,", and the third content portion 40-N "and buses".

As the transmitter device 32 transmits the content portions 40-1, 40-2, 40-N to the receiver device 34, for an unauthorized user monitoring the data communications carried over the multicast channels 30-1, 30-2, 30-M, the unauthorized user receives the content portions 40-1, 40-2, 40-N along with the noise elements 64. Because the noise elements 64 are configured as the same data type as the content portions 40-1, 40-2, 40-N the noise elements 64 hide the nature of the content 38 (e.g., message) distributed by the transmitter device 32. The use of the noise elements 64, therefore, minimizes the possibility for the unauthorized user to distinguish the noise elements 64 from the content portions 40-1, 40-2, 40-M and, therefore, accurately detect a portion of the content message 38.

In one arrangement, prior to transmitting the noise element 64, the transmitter device 32 transmits a first synchronization marker 60 to the receiver device 32 using the assigned multicast channel 30-1. After completing transmission of the noise element 64 to the receiver device 34, the transmitter device 32 transmits a second synchronization marker 62 and a subsequent portion 40-2 of the content 38 to the receiver device 32 using the assigned multicast channel 30-1. Use of the synchronization markers 60, 62 allows the receiver device 34 to identify and discard the noise elements 64 transmitted by the transmitter device 32 (e.g., "synchronizes" the receiver device 34 with the noise elements 64 transmitted by the transmitter device 32). For example, when the receiver device 34 receives the first synchronization marker 60 via the assigned multicast channel 30-1, the receiver device 34 ignores all communications (e.g., the noise element 64) received from the transmitter device 32 until the receiver device 34 receives the second synchronization marker 62. Upon reception of the second synchronization marker 62 via the assigned multicast channel 30-1, the receiver device 34 detects a subsequent content portion 40-2 transmitted by the transmitter device 32 using the multicast channel 30-1.

In one arrangement, the synchronization markers 60, 62 include flag or strings configured as the same data type as the content portions 40 and are indistinguishable from the content portions 40 by an unauthorized user. Such an arrangement, limits the possibility for an unauthorized user to detect the synchronization markers 60, 62 as indicating the presence of noise elements 64 transmitted over a multicast channel 30. In one arrangement, the transmitter device 32 selects the first synchronization marker 60 from a group of synchronization markers used to indicate the beginning of transmission of a noise element 64 and selects the second synchronization marker 62 from a group of synchronization markers used to indicate the end of transmission of a noise element 64. In such an arrangement, the transmitter device varies, over time, the synchronization markers 60, 62 transmitted to the receiver device 34, thereby limiting the possibility for an unauthorized user to distinguish particular portions, transmitted over the multicast channels 30, as synchronization markers 60, 62.

As indicated above, the use of multiple multicast channels 30 for transmission of content portions 40 forming content 38 minimizes the risk of an unauthorized user intercepting all of the content portions 40 forming the content 38 and, thereby, intercept the content 38 (e.g. content message) as a whole. The content distribution system 20 provides various mechanisms for dividing the content message 28 into content portions 40 and distributing the content portions 40 using the multiple multicast channels 30, as described below.

Figure 4:
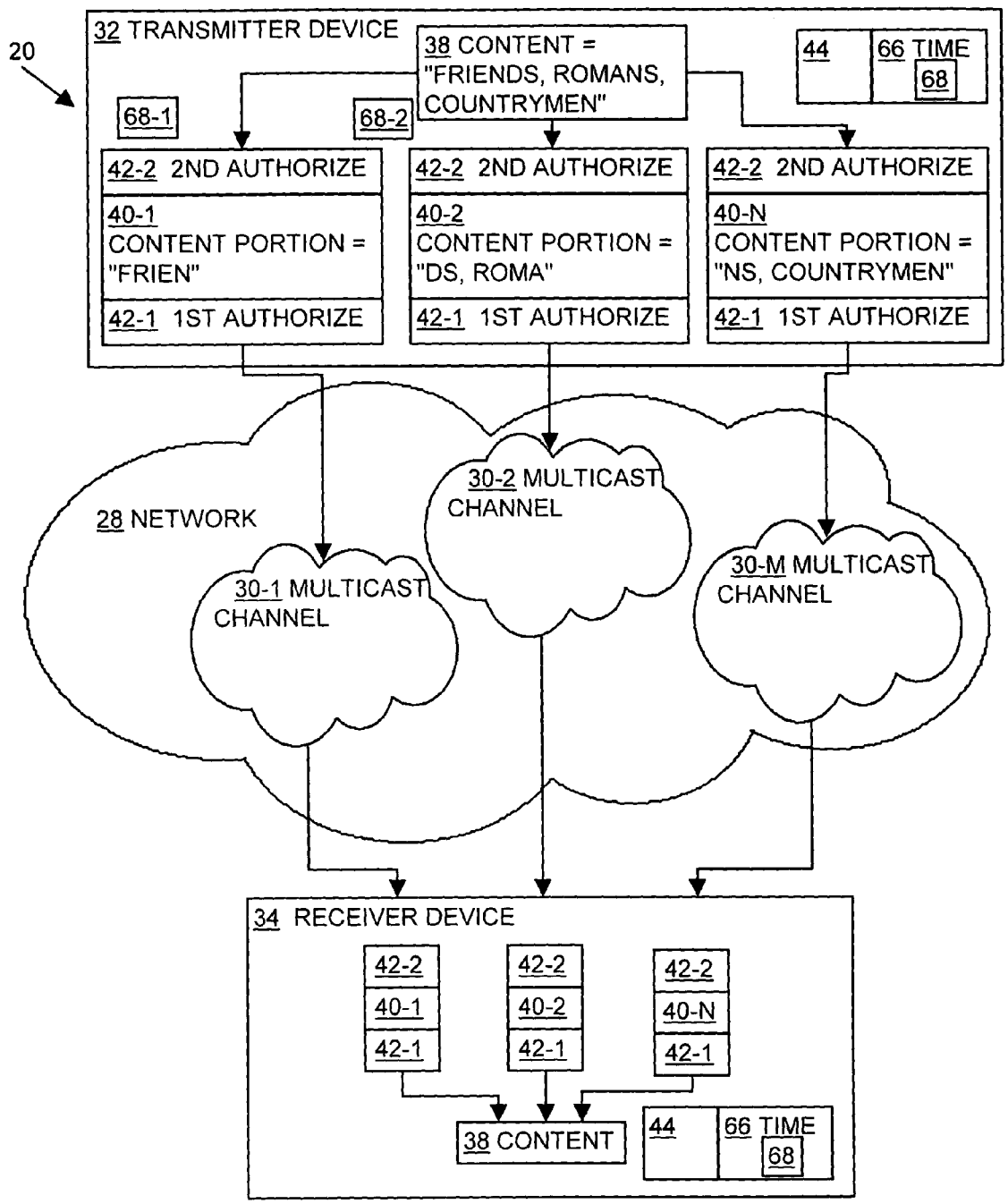
FIG. 4 shows the system of FIG. 1, according to one embodiment of the invention.

FIG. 4 illustrates one arrangement of the content distribution system 20 where the transmitter device 32 transmits, and the receiver device 34 receives, content portions 40 using each of the multicast channels 30-1, 30-2, and 30-M in a "rolling fashion" (e.g., serial use of each of the multicast channels 30-1, 30-2, and 30-M, one after another). The transmitter device 32 and the receiver device 34 switch from the first multicast channel 30-1 to the second multicast channel 30-2 and from the second multicast channel 30-2 to the third multicast channel 30-2 in a synchronized manner to transmit and receive, respectively, content portions 40 over each multicast channel 30-1, 30-2, 30-M for a relatively small period of time. Because the transmitter device 32 and the receiver device 34 utilize each multicast channel 30-1, 30-2, and 30-M for a relatively small period of time, such a configuration minimizes the possibility for an unauthorized user or attacker to inject unauthorized content (e.g., noise) into the message or content 38 transmitted to the receiver device 34. Transmission and reception of content portions 40 over each of the multicast channels 30-1, 30-2, and 30-M, therefore, maintains the integrity of the content message 38 as a whole.

In order for the transmitter device 32 and the receiver device 34 to switch between multicast channels 30 in a synchronized manner, the transmitter device 32 and the receiver device 34 each utilize time duration information 66 to substantially synchronously transmit or receive content portions 40, over each of the multicast channels 30-1, 30-2, and 30-M. The time duration information 66 indicates an amount of time (e.g., time duration 68) that the transmitter device 32 and the receiver device 34 use a particular multicast channel 30 for transmission and reception of content portions 40. The time duration information 66 allows for synchronization between the transmitter device 32 and the receiver device 34 such that the transmitter device 32 and the receiver device 34 identify a time to substantially simultaneously switch transmission and reception of the content portions 40 from a first multicast channel 30-1 to a second multicast channel 30-2.

For example, in one arrangement, the transmitter device 32 and the receiver device 34 each the time duration information 66 from the computerized device 72, as shown in FIG. 1, with the requested multicast channel information 44. In one arrangement, the time duration information 66 includes a shared mechanism or "shared secret" that causes the transmitter device 32 and the receiver device 34 to produce synchronized pseudorandom numbers. Each pseudorandom number produced corresponds to a particular multicast channel address within the multicast channel information 44 and represents an amount of time 68 that the transmitter device 32 and the receiver device 34 utilize a associated multicast channel 30, such as measured by clock devices (e.g., network time server (NTS) clocks or global positioning system (GPS) clocks) associated with each of the transmitter device 32 and the receiver device 34. The pseudorandom number and multicast addresses, therefore, form a multicast address and time duration pair (e.g., [multicast address, time duration]) for transmission of content portions 40 over the network 28.

During operation, the transmitter device 32 and the receiver device 34 detect a time duration, based upon the time duration information 66, associated with a first multicast channel 30-1 of the multicast channels 30 within the network for transmission and reception of a content portion 40 over the multicast channel 30-1. The transmitter device 32 transmits a first portion of the content 40-1 to the receiver device 34 during the first time duration 68 using the first multicast channel 30-1. The receiver device 34, in turn, receives the first portion of the content 40-1 to the receiver device 34 during the first time duration 68 using the first multicast channel 30-1. The transmitter device 32 and the receiver device 34 each monitor the first time duration 68 and detect an expiration of the first time duration 68 associated with the first multicast channel 30-1. The transmitter device 32 and the receiver device 34 switch to a second multicast channel 30-2 in response to detecting expiration of the first time duration. The transmitter device 32 transmits, and the receiver device 34 receives, a second portion of the content 40-2 using the respective second multicast channel 30-2. Such a configuration minimizes the possibility for an unauthorized user to inject noise into the content message 38 transmitted to the receiver device 34.

For example, assume the time duration information 66 indicates that the transmitter device 32 and the receiver device 34 transmit and receive, respectively, data over the first multicast channel 30-1 for a first time duration of 0.25 seconds and over the second multicast channel for a second time duration of 0.25 seconds. Further assume the content 38 for transmission is the text string "Friends, Romans, Countrymen". During operation, the transmitter device 32 then transmits a content portion 40-1 of the content 38 to the receiver device 34 using the first multicast channel 30-1 for a first time duration 68-1 of 0.25 seconds. The receiver device 34 also receives the content portion 40-1 of the content 38 from the transmitter device 32 using the first multicast channel 30-1 for the first time duration 68-1 of 0.25 seconds. In such an arrangement, the transmitter device 32 arbitrarily splits or fragments the content 38 into content portions 40.

For example, in the first time duration 68-1 of 0.25 seconds, as illustrated in FIG. 4, the transmitter device 32 transmits, and the receiver device 34 receives, the text "Frien" as the first content portion 40-1. Upon expiration of the first time duration 68-1, the transmitter device 32 and the receiver device 34 switch to the second multicast channel 30-2 for respective transmission and reception of the second content portion 40-2. For the second time duration 68-2 of 0.25 seconds, as illustrated, the transmitter device 32 transmits, and the receiver device 34 receives, via the second multicast channel 30-2, the text string "ds, Roma" as the second content portion 40-2. Upon expiration of the second time duration 68-2, the transmitter device 32 and the receiver device 34 switch to the third multicast channel 30-M for respective transmission and reception of a third content portion 40-2. As illustrated, the transmitter device 32 transmits, and the receiver device 34 receives, via the third multicast channel 30-M, the text string "ns, Countrymen" as the third content portion 40-N.

In one arrangement, the transmitter device 32 transmits an authorization value 42 to the receiver device 34 prior to transmitting a content portion 40 to the receiver device 32. For example, as illustrated in FIG. 1, prior to transmitting the content portion 40-1 via the first multicast channel 30-1 within the network 28, the transmitter device 32 transmits a first authorization value 42-1 to the receiver device 34 using the respective first multicast channel 30-1 (e.g., the respective assigned multicast channel 30-1 for content portion 40-1). After transmitting the content portion 40-1 via the first multicast channel 30-1, the transmitter device 32 transmits a second authorization value 42-2 to the receiver device 34. The first authorization value 42-1 and the second authorization value 42-2 indicate, to the receiver device 34, an identity of the transmitter device 32 and a start and end of transmission from the transmitter device 32, respectively (e.g., the start and end of "legitimate communications" or content portions 40 of the content message 38) carried by the multicast channel 30.

In one arrangement, the transmitter device 32 and the receiver device 34 generate or derive the authorization values 42-1, 42-2 based upon the shared mechanism or "shared secret" received form the computerized device 72 and utilizing an algorithm common to both the transmitter device 32 and the receiver device 34. The use of the authorization values 42-1, 42-2 limits the ability for an unauthorized user to inject unauthorized content or noise into a particular multicast channel 30 and thereby "jam" the transmission of the content message 38 from the transmitter device 32 to the receiver device 34. In the case where the receiver device 34 detects content over a particular multicast channel that does not include associated authorization values 42-1, 42-2, the receiver device 34 detects the presence of unauthorized content (e.g., noise transmitted by an unauthorized user) and discontinues reception of transmission via that particular multicast channel. The receiver device switches to another multicast channel 30, as indicated by the multicast channel information 44 to receive further content portions 40 from the transmitter device 32.

Figure 5:
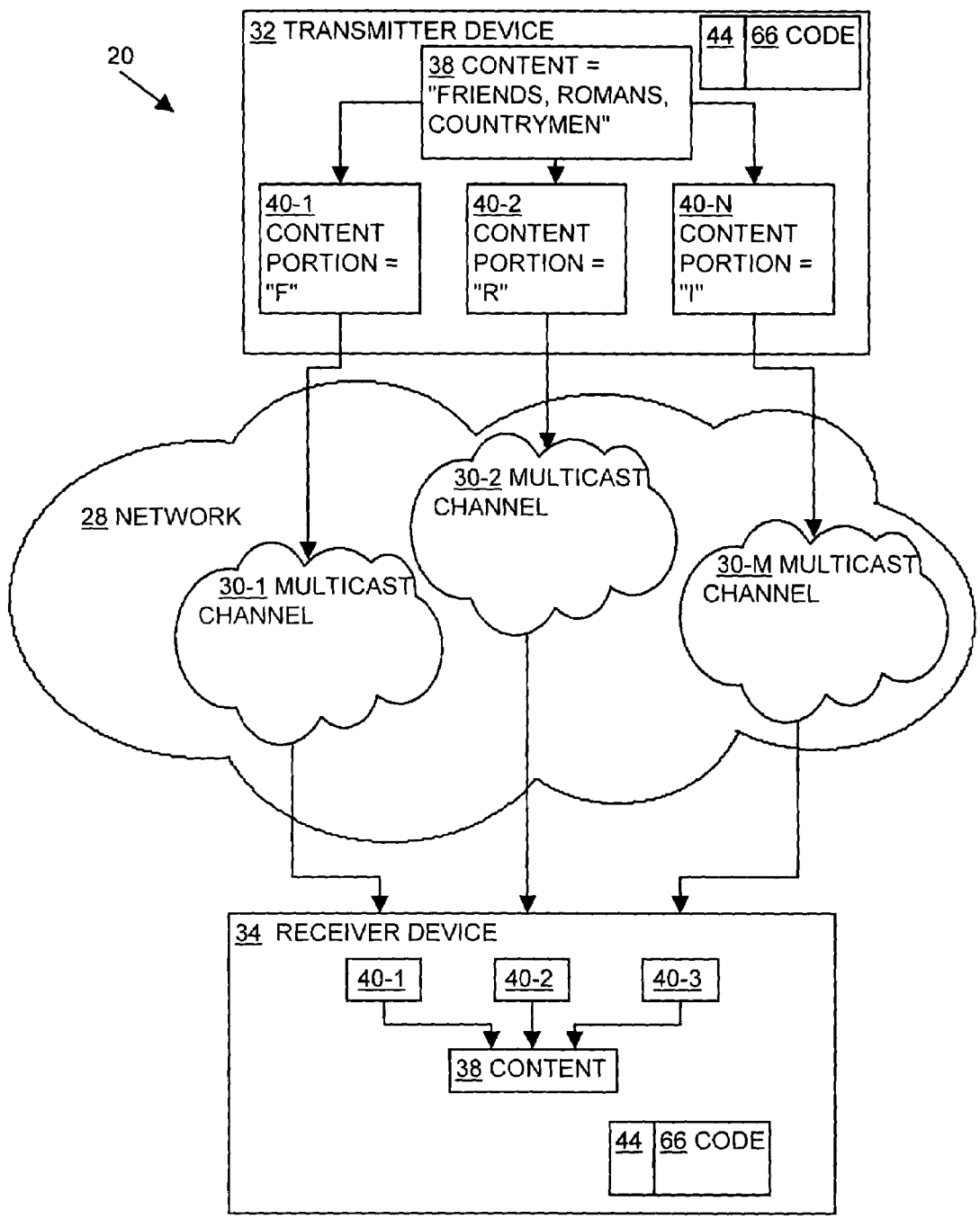
FIG. 5 illustrates the system of FIG. 1, according to one embodiment of the invention.

FIG. 5 illustrates another arrangement of the content distribution system 20 where the transmitter device 32 transmits, and the receiver device 34 receives, content portions 40 using each of the multicast channels 30-1, 30-2, and 30-M in a "spread spectrum" arrangement. In the "spread spectrum" arrangement, the transmitter device 32 splits the content 38 among the multicast channels 30 in the network 28 using a content spreading characteristic 80. The "spread spectrum" arrangement minimizes the ability for an unauthorized user to intercept and identify of the content portions 40 forming a content message 38 since there is a relatively low probability that a single unauthorized user knows or has the ability to monitor all of the multicast channels 30 used, within the network 28, to transmit the content message 38. Also, the content spreading characteristic 80 causes the transmitter device 32 to distribute the content 38 as content portion 40 among the multicast channels 30 such that during transmission, for an unauthorized user monitoring a single multicast channel, the unauthorized user is unable to distinguish the content portions 40, transmitted over the multicast channel, from noise.

During operation, the transmitter device 32 and the receiver device 34 each receive the content spreading characteristic 80 from the computerized device 72, as shown in FIG. 1, with the requested multicast channel information 44. With respect to the transmitter device 32, the content spreading characteristic 80 relates to a mechanism for partitioning a content message 38 into content portions 40 (e.g., dividing the content 38 into the respective portions of the content 40) for distribution to the receiver device 34. For example, as shown in FIG. 5, the transmitter device 32, using the content splitting mechanism 80, divides the content message 38 (e.g., the text string "Friends, Romans, Countrymen") into content portions 40-1, 40-2, 40-N where each content portion 40 includes a single character from the text string). The content splitting mechanism 80 also indicated to the transmitter device the way in which the transmitter device 32 assigns the content portions 40-1, 40-2, 40-N to the multicast channels 30. As illustrated, the transmitter device 32 assigns the first content portion "F" 40-1 to the first multicast channel 30-1, the second content portion "R" 40-2 to the second multicast channel 30-2 and the third content portion "I" 40-N to the third content channel 30-M. In the case where the number of bits (e.g. content portions 40) forming the content message 38 is greater than the number of available multicast channels 30 in the network 28, the content splitting mechanism 80, in one arrangement, indicates to the transmitter device 32 to assign the remaining bits forming the content message to each available multicast channel 30 in a round-robin fashion (e.g., a fourth content portion "E" assigned to multicast channel 30-1, a fifth content portion "N" assigned to multicast channel 30-2, a sixth content portion "D" assigned to multicast channel 30-M).

After assigning the content portions 40 to the respective multicast channels 30, the transmitter device substantially simultaneously transmits the content portions 40 forming the content 38 to the receiver device 34 using the respective assigned multicast channels 30. In turn the receiver device 34 substantially simultaneously receives the content portions 40 using the respective assigned multicast channels 30 (e.g., the assigned multicast channels 30 indicated in the multicast channel information 44).

After the receiver device 34 receives the content portions 40 from the transmitter device 32 via the respective multicast channels 30-1, 30-2, 30-M, the receiver device 34 assembles the content portions 40 to form the content message 38, based upon the content spreading characteristic 80. For example, when the receiver device 32 receives the content portions 40-1, 40-2, 40-N, the receiver device 34 examines the content portions 40-1, 40-2, 40-N and, based upon the content spreading characteristic 80, detects an order to the content portions 40-1, 40-2, 40-N, as divided by the transmitter device 32. Based upon such detection, the receiver device 34 assembles the content portions 40-1, 40-2, 40-N to form the content message 38 (e.g., the content message 38, prior to division into content portions 40, by the transmitter device 32).

Figure 6:
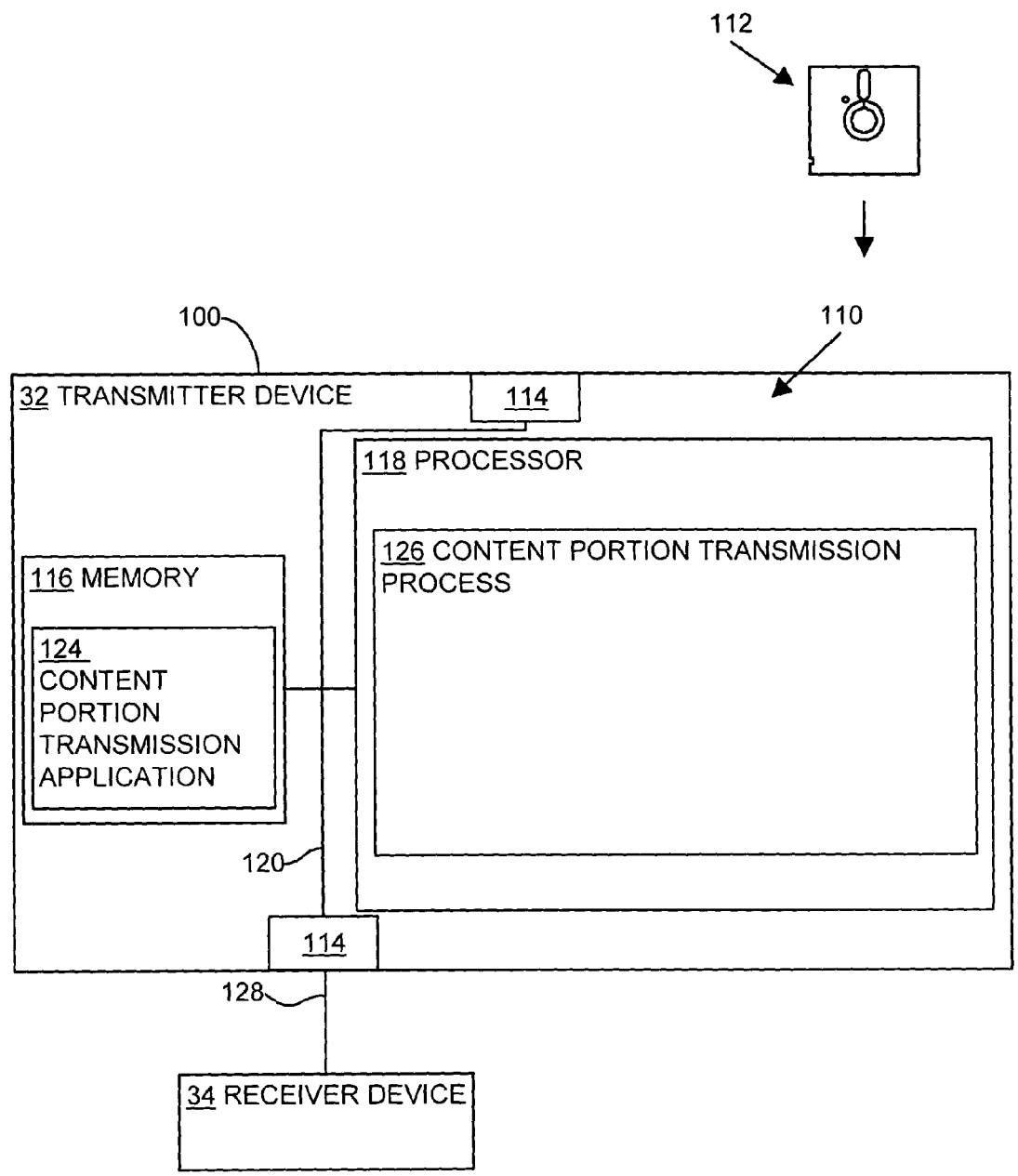
FIG. 6 depicts a computer implementation of a transmitter device, according to one embodiment of the invention.

FIG. 6 illustrates a more detailed architecture of a transmitter device 32 configured according to one embodiment of the invention. FIG. 6 shows a computer device 100, configured to run as a transmitter device 32, in one embodiment of the invention. A computer program product 112 includes an application or logic instructions that are loaded into the computer device 100 to configure the device 100 to perform as a transmitter device 32. For example, in one arrangement, the transmitter device 32 receives the multicast channel information 44 as the computer program product 112.

The transmitter device 32, in this example embodiment of the invention, includes an interconnection mechanism 120 such as a data bus and/or other circuitry that interconnects a controller 110, having a memory 116 and a processor 118, and one or more communications interfaces 114. The communication interface 114 connects with a receiver device 34 via a connection 128. For example, the connection 128, in one arrangement is a multicast channel 30 in network 28.

The memory 116 may be any type of volatile or non-volatile memory or storage system such as computer memory (e.g., random access memory (RAM), read-only memory (ROM), or other electronic memory), disk memory (e.g., hard disk, floppy disk, optical disk and so forth). The memory 116 is encoded with logic instructions (e.g., software code) and/or data that form a content portion transmission application 124 configured according to embodiments of the invention. In other words, the content portion transmission application 124 represents software code, instructions and/or data that represent or convey the processing logic steps and operations as explained herein and that reside within memory or storage or within any computer readable medium accessible to the transmitter device 32.

The processor 118 represents any type of circuitry or processing device such as a central processing unit, microprocessor or application-specific integrated circuit that can access the content portion transmission application 124 encoded within the memory 116 over the interconnection mechanism 120 in order to execute, run, interpret, operate or otherwise perform the content portion transmission application 124 logic instructions. Doing so forms the content portion transmission process 126. In other words, the content portion transmission process 126 represents one or more portions of the logic instructions of the content portion transmission application 124 while being executed or otherwise performed on, by, or in the processor 118 within the transmitter device 32. The transmitter device 32 in FIG. 1 collectively represents either one or both of the content portion transmission application 124 and the content portion transmission process 126.

Figure 7:
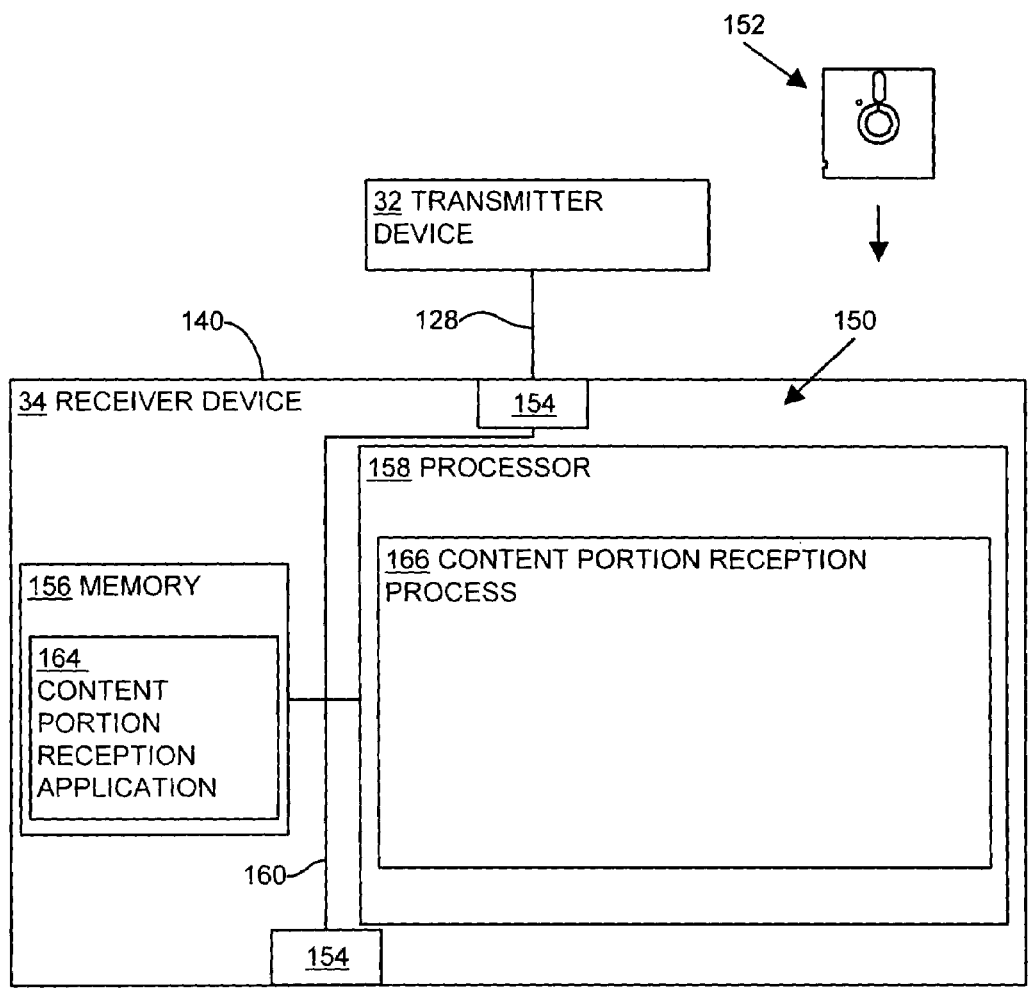
FIG. 7 depicts a computer implementation of a receiver device, according to one embodiment of the invention.

FIG. 7 illustrates a more detailed architecture of a receiver device 34 configured according to one embodiment of the invention. FIG. 7 shows a computer device 140, configured to run as a receiver device 34, in one embodiment of the invention. A computer program product 152 includes an application or logic instructions that are loaded into the computer device 140 to configure the device 140 to perform as a receiver device 34. For example, in one arrangement, the receiver device 34 receives the multicast channel information 44 as the computer program product 152.

The receiver device 34, in this example embodiment of the invention, includes an interconnection mechanism 160 such as a data bus and/or other circuitry that interconnects a controller 150, having a memory 156 and a processor 158, and one or more communications interfaces 154. The communication interface 154 connects with a transmitter device 32 via a connection 128. For example, the connection 128, in one arrangement is a multicast channel 30 in network 28.

The memory 156 may be any type of volatile or non-volatile memory or storage system such as computer memory (e.g., random access memory (RAM), read-only memory (ROM), or other electronic memory), disk memory (e.g., hard disk, floppy disk, optical disk and so forth). The memory 156 is encoded with logic instructions (e.g., software code) and/or data that form a content portion reception application 164 configured according to embodiments of the invention. In other words, the content portion reception application 164 represents software code, instructions and/or data that represent or convey the processing logic steps and operations as explained herein and that reside within memory or storage or within any computer readable medium accessible to the receiver device 34.

The processor 158 represents any type of circuitry or processing device such as a central processing unit, microprocessor or application-specific integrated circuit that can access the content portion reception application 164 encoded within the memory 156 over the interconnection mechanism 160 in order to execute, run, interpret, operate or otherwise perform the content portion reception application 164 logic instructions. Doing so forms the content portion reception process 166. In other words, the content portion reception process 166 represents one or more portions of the logic instructions of the content portion reception application while being executed or otherwise performed on, by, or in the processor 158 within the receiver device 34. The receiver device 34 in FIG. 1 collectively represents either one or both of the content portion reception application 164 and the content portion reception process 166.

Those skilled in the art will understand that there can be many variations made to the embodiments explained above while still achieving the same objective of those embodiments and the invention in general.

For example, the transmitter device 32 utilizes each multicast channel 30 to transmit content portions 40 forming a content message to a receiver device 34. In the case where the transmitter device 32 does not utilize a particular multicast channel 30 for transmission of the content portions 40, the transmitter device 32 transmits noise on the unused or non-utilized multicast channels 30.

As indicated above, FIG. 1 illustrates the network 28 as having multicast channels 30. The multicast channels 30 provide one-to-many transmission of content 40 from the transmitter device 32 to the receiver device 34. In one arrangement, the channels are configured as broadcast channels that provide broadcast transmission of content from transmitter devices 32 to receiver devices 34.

As indicated above, the transmitter device 32 and the receiver device 34 transmit requests 70-1, 70-2 for multicast channel information to a computerized device 72. In one arrangement the transmitter device 32 and the receiver device 34 transmit the requests 70-1, 70-2 outside of (e.g., not using) the multicast channels 30 of the network 28. Such non-multicast channel transmission of the requests 70-1, 70-2 minimizes the possibility for an unauthorized user, monitoring the multicast channels 30 of the network 20, to intercept the multicast channel information 44 transmitted in response to the respective requests 70-1, 70-2 and, therefore, have the ability to access the content portions 40 transmitted in the respective multicast channels 30.

As indicated above, in one arrangement, in order for the transmitter device 32 and the receiver device 34 to switch between multicast channels 30 in a synchronized manner, the transmitter device 32 and the receiver device 34 each utilize time duration information 66 to substantially synchronously transmit or receive content portions 40, over each of the multicast channels 30-1, 30-2, and 30-M. The time duration information 66 indicates an amount of time (e.g., time duration 68) that the transmitter device 32 and the receiver device 34 use a particular multicast channel 30 for transmission and reception of content portions 40. In another arrangement, the time duration information 66 relates to a clock formed as part of the content portions 40 themselves.

For example, assume the time duration information 68 relates to a particular number of bits transmitted from the transmitter device 32 to the receiver device 34. In such a case the time duration information 68 indicates to the transmitter device 32 and the receiver device 34 to switch transmission and reception, respectively, of the content portions 40 from a first multicast channel 30-1 to a second multicast channel 30-2 after the transmitter device 32 transmits and the receiver device 34 receives a particular number of bits (e.g., data pattern) of one or more content portions 40.

In another example, assume the time duration information 68 is a flag associated with a content portion 40. In such a case, the transmitter device 32 and the receiver device 34 switch transmission and reception, respectively, of the content portions 40 from a first multicast channel 30-1 to a second multicast channel 30-2 after the transmitter device 32 and the receiver device detect the presence of a time duration flag associated with a particular content portion 40.

As indicated above, one arrangement of the content distribution system 20 involves the transmitter device 32 transmitting, and the receiver device 34 receiving, content portions 40 using each of the multicast channels 30-1, 30-2, and 30-M in a "spread spectrum" arrangement. In such a spread spectrum arrangement, during transmission of the content portions from the transmitter device 32 to the receiver device 34, the content portions 40 (e.g., the bits forming the content portions 40) can "collide". In one arrangement, the transmitter device 32 encodes the content portions 40 with an error-detecting or correction code to minimize the effects of a "collision"

In one arrangement of a "collision", the network 28 drops (e.g., fails to deliver) the collided content portions 40 to the receiver device 34. As the receiver device 34 receives the encoded content portions 40, the receiver device 34 examines the error-detecting code to detect if the receiver device has received all of the content portions 40 forming a content message 38. In the case where, based upon the examination of the error-detecting code, the receiver device determines that the receiver device 34 has not received all of the content portions 40 forming a content message 38, the receiver device transmits a request to the transmitter device 32 to re-transmit the content message via the multicast channels 30 of the network 28.

In another arrangement of a "collision", the transmitter device 32 can select (e.g., randomly select) a multicast channel 30, for transmission of content portions 40 to the receiver device 34, already in use by another device. In such a case, the collision of content portions 40 occurs when the receiver device 34 receives, over the multicast channel 30, the content portions 40 sent by the transmitter device 32 and receives content (e.g., information) transmitted by the other device using the same multicast channel 30. As the receiver device 34 receives the encoded content portions 40, the receiver device 34 examines the error-detecting code to distinguish the content portions 40 sent from the transmitter device 32 from the information or content received from the other device using the multicast channel 30.

As indicated above, the network 28 is a computer network having multicast-enabled data communication devices 36 (e.g., devices that provide a one-to-many transmission of content portions 40) grouped to form multicast channels 30. As illustrated in FIG. 1, each multicast channel 30-1, 30-2, 30-M includes distinct data communications devices 36 (e.g., multicast channel 30-1 includes devices 36-1 and 36-4, multicast channel 30-2 includes devices 36-2 and 36-5, and multicast channel 30-M includes devices 36-3 and 36-X). Such an arrangement is by way of example only. In another arrangement, some or all of the data communications devices 36 participate in multiple, distinct multicast channels 30.

For example, assume the data communications device 36-1 forms part of each distinct multicast channel 30-1, 30-2, and 30-M. In such a case, when the transmitter device 32 sends a first content portion 40-1 to the receiver device 34 using the first multicast channel 30-1, the data communications device 36-1, acting as part of the first multicast channel 30-1 can carry (e.g., aid in transmission of) the first content portion 40-1 to the receiver device 34. When the transmitter device 32 sends a second content portion 40-2 to the receiver device 34 using the second multicast channel 30-2, the data communications device 36-1, acting as part of the second multicast channel 30-2 can carry the second content portion 40-2 to the receiver device 34. When the transmitter device 32 sends a third content portion 40-N to the receiver device 34 using the third multicast channel 30-M, the data communications device 36-1, acting as part of the third multicast channel 30-M can carry the third content portion 40-N to the receiver device 34.

As indicated above, as shown in FIG. 5, the transmitter device 32, using the content splitting mechanism 80, divides the content 38 (e.g., the text string "Friends, Romans, Countrymen") into content portions 40-1, 40-2, 40-N where each content portion 40 includes a single character from the text string. Such an arrangement is by way of example only. In another arrangement, the transmitter device 32, using the content splitting mechanism 80, divides the content 38 into content portions 40-1, 40-2, 40-N where each content portion 40 includes a single bit (e.g., 1 or 0) that forms part of the content 38.

Such variations are intended to be covered by the scope of this invention. As such, the foregoing description of embodiments of the invention is not intended to be limiting. Rather, any limitations to the invention are presented in the following claims.

What is claimed is:

1. In a transmitter device of a content distribution system, a method for transmitting content comprising:
   detecting a plurality of multicast channels for transmission of the content to a receiver device;
   assigning portions of the content to respective multicast channels of the plurality of multicast channels for distribution to the receiver device; and
   transmitting the portions of the content to the receiver device using the respective assigned multicast channels;
   assigning a noise element to at least one of the multicast channels, the noise element containing data pertaining to data of at least one of the portions of the content; and
   transmitting the noise element using the assigned multicast channel.

2. The method of claim 1 further comprising
   prior to transmitting the noise element using the assigned multicast channel, transmitting a first synchronization marker to the receiver device using the assigned multicast channel; and
   after completing transmission of the noise element using the assigned multicast channel, transmitting a second synchronization marker to the receiver device using the assigned multicast channel.

3. The method of claim 2 wherein, after transmitting a second synchronization marker to the receiver device using the assigned multicast channel, transmitting the portion of the content to the receiver device using the respective assigned multicast channel.

4. The method of claim 1 further comprising detecting a time duration associated with a first multicast channel of the plurality of multicast channels, wherein the steps of assigning and transmitting comprise transmitting a first portion of the content to the receiver device during the time duration using a first multicast channel, and further comprising:
   detecting expiration of the time duration associated with the first multicast channel;
   switching to a second multicast channel in response to detecting expiration of the time duration; and
   transmitting a second portion of the content to the receiver device using the respective second multicast channel.

5. The method of claim 1 further comprising:
   prior to transmitting the portions of the content to the receiver device using the respective assigned multicast channels, transmitting a first authorization value to the receiver device using the respective assigned multicast channels to indicate a start of transmission from and an identity of the transmitter device; and
   after completing transmission of the portions of the content to the receiver device using the respective assigned multicast channels, transmitting a second authorization value to the receiver device using the respective assigned multicast channels to indicate an end to the transmission from and the identity of the transmitter device.

6. The method of claim 1 wherein:
   the step of assigning comprises, based upon a content spreading characteristic, assigning portions of the content to the respective multicast channels of the plurality of multicast channels for distribution to the receiver device, the content spreading characteristic indicating a division of the content into the respective portions of the content; and
   the step of transmitting comprises substantially simultaneously transmitting the portions of the content to the receiver device using the respective assigned multicast channels.

7. The method of claim 1 wherein the step of detecting comprises detecting a plurality of multicast channels, each of the plurality of multicast channels formed along a distinct communication path within the content distribution system.

8. The device as in claim 1, wherein transmitting the portions of the content and the noise element include:
   during transmission, manifesting an appearance, to a third party, that the noise element and the portion of the content have a similar relevance with respect to the content due to the noise element and the portion both containing data of the similar subject matter.

9. The device as in claim 1, wherein assigning the noise element to at least one of the multicast channels, the noise element containing data pertaining to data of at least one of the portions of the content includes:
   creating the data of the noise element to be minimally different than data of at least one of the portions of content so as to minimize an unauthorized user from detecting a difference between the noise element and the at least one of the portion of content.

10. A computerized device associated with a content distribution system comprising:
    at least one communications interface;
    a controller; and
    an interconnection mechanism coupling the at least one communications interface and the controller;
    wherein controller is configured to:
    detect a plurality of multicast channels for transmission of the content to a receiver device;
    assign portions of the content to respective multicast channels of the plurality of multicast channels for distribution to the receiver device; and
    transmit the portions of the content to the receiver device using the respective assigned multicast channels;
    assign a noise element to at least one of the multicast channels, the noise element containing data that pertains to similar subject matter as data of at least one of the portions of the content; and transmit the noise element using the assigned multicast channel.

11. The computerized device of claim 10 wherein the controller is further configured to:
   prior to transmitting the noise element using the assigned multicast channel, transmit a first synchronization marker to the receiver device using the assigned multicast channel; and
   after completing transmission of the noise element using the assigned multicast channel, transmit a second synchronization marker to the receiver device using the assigned multicast channel.

12. The computerized device of claim 11 wherein the controller is further configured to, after transmitting a second synchronization marker to the receiver device using the assigned multicast channel, transmit the portion of the content to the receiver device using the respective assigned multicast channel.

13. The computerized device of claim 10 wherein the controller is further configured to detect a time duration associated with a first multicast channel of the plurality of multicast channels, wherein, when assigning, the controller is configured to allocate a first portion of the content for transmission to the receiver device using the first multicast channel based upon the time duration wherein, when transmitting, the controller is configured to transmit the first portion of the content to the receiver device during the time duration using the respective allocated first multicast channel, and wherein the controller is further configured to:
   detect expiration of the time duration associated with the first multicast channel;
   switch to a second multicast channel in response to detecting expiration of the time duration; and
   transmit a second portion of the content to the receiver device using the respective assigned second multicast channel.

14. The computerized device of claim 10 wherein the controller is further configured to:
   prior to transmitting the portions of the content to the receiver device using the respective assigned multicast channels, transmit a first authorization value to the receiver device using the respective assigned multicast channels to indicate a start of transmission from and an identity of the transmitter device; and
   after completing transmission of the portions of the content to the receiver device using the respective assigned multicast channels, transmit a second authorization value to the receiver device using the respective assigned multicast channels to indicate an end to the transmission from and the identity of the transmitter device.

15. The computerized device of claim 10 wherein the controller is further configured to:
   when assigning, based upon a content spreading characteristic, assign portions of the content to the respective multicast channels of the plurality of multicast channels for distribution to the receiver device, the content spreading characteristic indicating a division of the content into the respective portions of the content; and
   when transmitting, substantially simultaneously transmit the portions of the content to the receiver device using the respective assigned multicast channels.

16. The computerized device of claim 10 wherein the controller, when detecting, is configured to detect a plurality of multicast channels, each of the plurality of multicast channels formed along a distinct communication path within the content distribution system.

17. A computer program product having a computer-readable medium including computer program logic encoded thereon that, when performed on a controller in a computerized device having a coupling to at least one communications interface provides a method for performing the operations of:
   detecting a plurality of multicast channels for transmission of the content to a receiver device;
   assigning portions of the content to respective multicast channels of the plurality of multicast channels for distribution to the receiver device; and
   assigning a noise element to at least one of the multicast channels, the noise element containing data that pertains to similar subject matter as data of at least one of the portions of the content;
   transmitting the portions of the content to the receiver device using the respective assigned multicast channels; and
   transmitting the noise element using the assigned multicast channel.

18. A computerized device comprising:
   at least one communications interface;
   a controller; and
   an interconnection mechanism coupling the at least one communications interface and the controller;
   wherein the computerized device is configured to produce a means for multicasting content, such means including:
   means for detecting a plurality of multicast channels for transmission of the content to a receiver device;
   means for assigning portions of the content to respective multicast channels of the plurality of multicast channels for distribution to the receiver device;
   means for assigning a noise element to at least one of the multicast channels, the noise element containing data that pertains to similar subject matter as data of at least one of the portions of the content;
   means for transmitting the portions of the content to the receiver device using the respective assigned multicast channels; and
   transmit the noise element using the assigned multicast channel.

19. In a receiver device of a content distribution system, a method for receiving multicast content comprising:
   detecting a plurality of multicast channels for reception of the content from a transmitter device;
   assigning multicast channels of the plurality of multicast channels for reception of portions of the content from the transmitter device;
   assigning multicast channels of the plurality of multicast channels for reception of a noise element, the noise element containing data that pertains to similar subject matter as data of at least one of the portions of the content; and
   receiving the portions of the content and the at least one noise element using the respective assigned multicast channels.

20. The method of claim 19 further comprising
   receiving a first synchronization marker from the transmitter device using the assigned multicast channel to indicate a start of transmission of a noise element;
   discarding the noise element received from the transmitter device using the assigned multicast channel; and receiving a second synchronization marker from the transmitter device using the assigned multicast channel to indicate an end of transmission of the noise element.

21. The method of claim 19 further comprising detecting a time duration associated with a first multicast channel of the plurality of multicast channels, wherein the step of receiving comprises receiving a first portion of the content during the time duration using the first multicast channel, and further comprising:

detecting expiration of the time duration associated with the first multicast channel;

switching to a second multicast channel in response to detecting expiration of the time duration; and receiving a second portion of the content from the transmitter device using the second multicast channel.

22. The method of claim 19 further comprising:

receiving a first authorization value from the transmitter device using the respective assigned multicast channels to indicate a start of reception of the portions of the content from the transmitter device and an identity of the transmitter device; and receiving, after completion of transmission of the portions of the content from the transmitter device, a second authorization value from the transmitter device using the respective assigned multicast channels to indicate an end to the reception of the content from the transmitter device.

23. The method of claim 19 wherein:

the step of receiving comprises, based upon a content spreading characteristic, substantially simultaneously receiving the portions of the content to the receiver device using the respective assigned multicast channels, the content spreading characteristic indicating a division of the content into the respective portions of the content; and assembling the portions of the content into content based upon the content spreading characteristic.

24. The method of claim 19 wherein the step of detecting comprises detecting a plurality of multicast channels, each of the plurality of multicast channels formed along a distinct communication path within the content distribution system.

25. A computerized device associated with a content distribution system comprising:

at least one communications interface;

a controller; and an interconnection mechanism coupling the at least one communications interface and the controller;

wherein controller is configured to:

detect a plurality of multicast channels for reception of the content from a transmitter device;

assign multicast channels of the plurality of multicast channels for reception of portions of the content and at least one noise element from the transmitter device, the noise element containing data that pertains to similar subject matter as data of at least one of the portions of the content; and receive the portions of the content and the at least one noise element using the respective assigned multicast channels.

26. The computerized device of claim 25 wherein the controller is further configured to:

receive a first synchronization marker from the transmitter device using the assigned multicast channel to indicate a start of transmission of a noise element;

discard the noise element received from the transmitter device using the assigned multicast channel; and receive a second synchronization marker from the transmitter device using the assigned multicast channel to indicate an end of transmission of the noise element.

27. The computerized device of claim 26 wherein the controller is configured to detect a time duration associated with a first multicast channel of the plurality of multicast channels, and, when receiving, receive a first portion of the content during the time duration using the first multicast channel, the controller further configured to:

detect expiration of the time duration associated with the first multicast channel;

switch to a second multicast channel in response to detecting expiration of the time duration; and receive a second portion of the content from the transmitter device using the second multicast channel.

28. The computerized device of claim 25 wherein the controller is further configured to:

receive a first authorization value from the transmitter device using the respective assigned multicast channels to indicate a start of reception of the portions of the content from the transmitter device and an identity of the transmitter device; and receive, after completion of transmission of the portions of the content from the transmitter device, a second authorization value from the transmitter device using the respective assigned multicast channels to indicate an end to the reception of the content from the transmitter device.

29. The computerized device of claim 25 wherein the controller is further configured to:

when receiving, based upon a content spreading characteristic, substantially simultaneously receive the portions of the content using the respective assigned multicast channels, the content spreading characteristic indicating a division of the content into the respective portions of the content; and assemble the portions of the content into content based upon the content spreading characteristic.

30. The computerized device of claim 25 wherein the controller is further configured to, when detecting, detect a plurality of multicast channels, each of the plurality of multicast channels formed along a distinct communication path within the content distribution system.

31. A computer program product having a computer-readable medium including computer program logic encoded thereon that, when performed on a controller in a computerized device having a coupling to at least one communications interface provides a method for performing the operations of:

detect a plurality of multicast channels for reception of the content from a transmitter device;

assign multicast channels of the plurality of multicast channels for reception of portions of the content and at least one noise element from the transmitter device, the noise element containing data that pertains to similar subject matter as data of at least one of the portions of the content; and receive the portions of the content and the at least one noise element using the respective assigned multicast channels.

32. A computerized device comprising:

at least one communications interface;

a controller; and an interconnection mechanism coupling the at least one communications interface and the controller;

wherein the computerized device is configured to produce a means for receiving multicast content, such means including:

means for detecting a plurality of multicast channels for reception of the content from a transmitter device;

means for assigning multicast channels of the plurality of multicast channels for reception of portions of the content and at least one noise element from the transmitter device, the noise element containing data that pertains to similar subject matter as data of at least one of the portions of the content; and means for receiving the portions of the content and the at least one noise element using the respective assigned multicast channels.

* * * * *